(No Model.)

W. S. HORRY.
REGENERATIVE GAS BURNER.

No. 392,434. Patented Nov. 6, 1888.

Witnesses:
J. B. McGivr.
E. O. Duffy.

Inventor
Wm. S. Horry.
By his Attorney
O. E. Duffy

UNITED STATES PATENT OFFICE.

WILLIAM SMITH HORRY, OF NEW YORK, N. Y., ASSIGNOR, BY DIRECT AND MESNE ASSIGNMENTS, TO THE UNITED STATES INCANDESCENT GAS LAMP COMPANY.

REGENERATIVE GAS-BURNER.

SPECIFICATION forming part of Letters Patent No. 392,434, dated November 6, 1888.

Application filed February 8, 1888. Serial No. 263,407. (No model.)

*To all whom it may concern:*

Be it known that I, WILLIAM SMITH HORRY, a subject of the Queen of Great Britain, residing at 49 Seventh avenue, New York city, State of New York, have invented a new and useful Regenerative Gas-Burner, of which the following is a specification.

My invention relates to an improvement in that class of lamps or gas-burners in which the air supplied to the flame is heated before being brought into contact with the same, thereby increasing the illuminating power of the gas used.

The object of my invention is to provide a lamp or burner of the class described, which shall be composed of a minimum number of exceedingly durable parts, so arranged and put together as to form a lamp or burner extremely cheap in first cost, of great strength and durability, and which will give a vastly superior light and consume less gas than the lamps of this class heretofore in use; and a further object is to so construct the lamp or burner that the flame will be spread by the heated air entering the combustion-chamber from above, and thus dispense with the use of wire-gauze deflecting-plates or the like, which serve the purpose of spreading the flame or dividing the air evenly before passing into contact with the flame, for the gauze is fragile and tender and soon becomes twisted and distorted by the great heat, it heats the air very imperfectly, and does not support the burner in any way, which becomes bent and drawn out of true by the heat, and is thus caused to give an uneven and irregular flame. Similar defects appear where a deflecting plate or plates or a single orifice around the burner is employed; but these disadvantages and objections are fully and completely overcome by my manner of constructing the lamp of a minimum number of solid durable parts and by conveying the air through tubes in which it is heated directly to the upper side of the flame, whereby the same is spread, and by conveying a limited supply of air to the under and outer surfaces of the flame by an outer series of vertical tubes.

With these ends in view my invention consists in certain novel features of construction and combination of parts more fully described hereinafter, and particularly pointed out in the claim.

Figure 1:
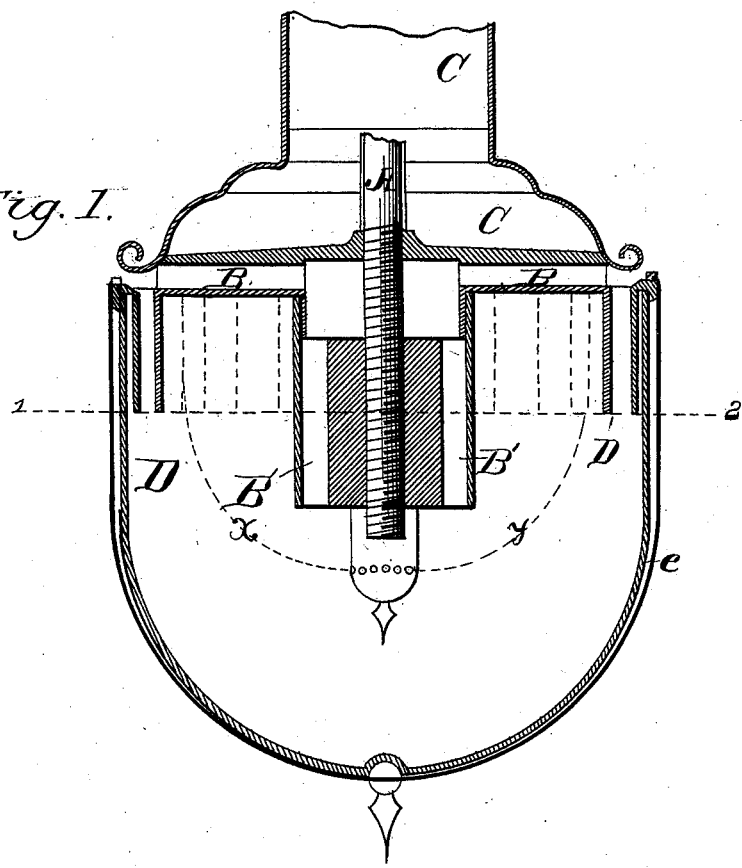
Figure 2:
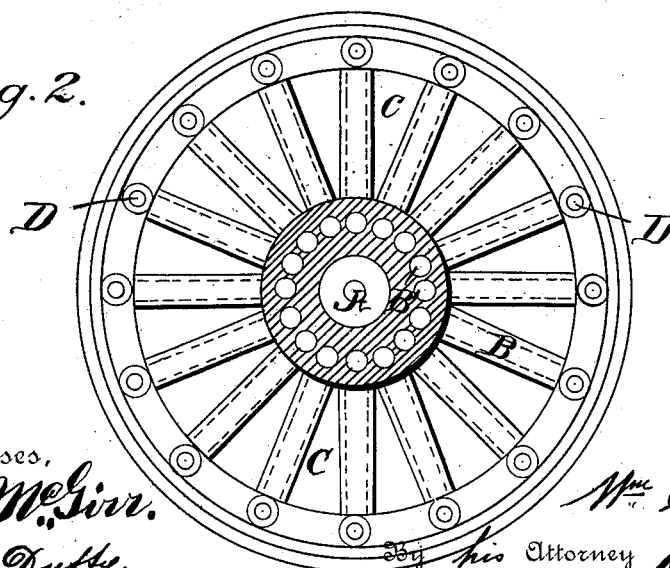

Referring to the accompanying drawings, Figure 1 represents a central longitudinal section of the lamp; and Fig. 2 is a transverse section on the line 1 2 of Fig. 1, looking up.

In the drawings, the reference-letter A indicates a gas supply pipe, which enters the lamp from above, and is surrounded for a suitable distance above the lamp by a cylindrical sleeve forming the discharge-flue C, through which the products of combustion find an exit, and which creates sufficient draft to supply the lamp with fresh air. The gas supply pipe passes downward centrally through the regenerative portion of the lamp, and is provided with a burner, A', screwed upon or otherwise secured to its lower end and having its bottom closed, and a series of gas-exit apertures around its periphery.

The body or upper portion of the lamp is composed of the regenerating-tubes B, which are formed in one piece and extend horizontally from a common center and across the lower portion of the flue C, so that the heated air and products of combustion from the flame pass around them, and thus heat the air passing into the lamp. The common center into which the tubes open and from which they extend is preferably hollow, as shown, and closed at the top, which has a central opening through which the gas-supply pipe extends, and is formed in the same piece with the tubes. Vertical regenerating-tubes B' communicate at their upper ends with the tubes B and extend downwardly around the burner, so as to open just above the apertures in the same, and thus supply heated air to the upper side of the flame. The vertical tubes B' are preferably longitudinally bored in a cylindrical piece provided with a central aperture through which the gas-supply pipe passes and in which it is secured, and the upper end of said cylindrical piece is secured to the under side of the center of the tubes B, formed in one piece, so that each tube B' will communicate with a horizontal radial tube, B. It will be seen that when the gas is turned on and lighted the heated air passing around the tubes B and up the flue C will draw in fresh air through the radial horizontal tubes, where it is heated and from thence passes down through the vertical regenerative tubes surrounding the burner and into contact with the upper face of the flame, which is spread by the same and caused to assume the form shown by the dotted lines $x\ y$.

Another set of vertical regenerative tubes, D, supply heated air to the under and outer side of the flame, and said tubes are located around the outer edge of the lamp and extend downwardly a suitable distance from the outer air at the open ends of the horizontal regenerative tubes. A dish-shaped globe, $e$, is secured at its upper edge to a flange around the outer end of the horizontal regenerative tubes, and the outer vertical regenerative tubes can be formed with or secured to said tubes. Said globe forms the combustion-chamber for the lamp, and is secured to the flange by a wire bail pivoted to said flange and passing around the globe and clamped in position by a locking-lever entering a recess in the bottom of the globe.

In practice the radially-extending tubes D and the central hub from which they extend are formed of a single casting, in which the tubes are drilled, and the inner vertical tubes which open just above the burner are formed by drilling a circular series of apertures longitudinally through and near the periphery of a solid casting of cylindrical form, a central opening being drilled through said solid cylinder for the passage of the gas-supply pipe.

The outer series of tubes, D, are formed by drilling a series of apertures vertically through an annular or ring-shaped casting.

Where a lamp or burner of extreme strength and solidity is required, the horizontal radial tubes, the circular series of vertical tubes registering with the same, and the outer series of vertical tubes can all be formed of one piece of metal by first forming a casting of the desired shape and then drilling the required tubes in the same.

It should be understood that by forming the radial and inner series of tubes of larger capacity a perfectly flat flame can be produced, and the shape of the flame can be regulated by varying the quantity of air supplied to its upper face and limiting the quantity of air entering through the outer series of vertical tubes.

A flange or wing extends partially over the open ends of the regenerative tubes and the air passes under the flange to enter the tubes, thus preventing the flame from being disturbed by sudden air-currents.

It is evident that a lamp constructed after the manner of my invention will be exceedingly strong and durable, as the regenerative tubes are, as before mentioned, drilled from the solid metal, and are formed in one piece, and cannot be affected by the extreme heat of the flame, as has heretofore been the case in lamps of this class, where wire-gauze is used or where a deflecting-plate spreads the flame. In my device the flame is spread by the air from the regenerative tubes which supply the upper side of the flame.

What I claim is—

The herein-described regenerative gas-burner, comprising a central gas-supply pipe provided upon its lower end with a burner having peripheral apertures, an upwardly-extending flue for the exit of the products of combustion, horizontal air-heating tubes extending radially from a common hub or center, through which the gas-pipe centrally passes transversely across the exit-flue to the outer air, said tubes and the hub or center being formed of a single piece of metal, a solid casting of cylindrical form located below said central hub and provided with a central opening through which the gas-supply pipe extends, and with a circular series of vertical air-tubes surrounding said central aperture and registering at their upper ends with the inner ends of said horizontal tubes, while their lower ends open on a line with or just above the apertures of the burner, thereby supplying air to and spreading the flame, and an outer circular series of air-tubes vertically drilled through an annular casting and supplying air to the under and outer sides of the flame, as set forth.

WILLIAM SMITH HORRY.

Witnesses:
A. L. HORRY,
JAMES A. BROWN.